(12) United States Patent
Liao et al.

(10) Patent No.: US 10,873,901 B2
(45) Date of Patent: Dec. 22, 2020

(54) DEVICE OF HANDLING SELECTION OF PUBLIC LAND MOBILE NETWORK FOR DEVICE-TO-DEVICE COMMUNICATION

(71) Applicant: HTC Corporation, Taoyuan (TW)

(72) Inventors: Ching-Yu Liao, Taoyuan (TW); Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 563 days.

(21) Appl. No.: 14/841,728

(22) Filed: Sep. 1, 2015

(65) Prior Publication Data

US 2016/0073335 A1 Mar. 10, 2016

Related U.S. Application Data

(60) Provisional application No. 62/045,580, filed on Sep. 4, 2014.

(51) Int. Cl.
| | | |
|---|---|---|
| *H04W 48/18* | (2009.01) | |
| *H04W 72/10* | (2009.01) | |
| *H04W 76/14* | (2018.01) | |
| *H04W 36/08* | (2009.01) | |
| *H04W 36/18* | (2009.01) | |
| H04W 84/04 | (2009.01) | |

(52) U.S. Cl.
CPC ........... *H04W 48/18* (2013.01); *H04W 36/08* (2013.01); *H04W 36/18* (2013.01); *H04W 72/10* (2013.01); *H04W 76/14* (2018.02); *H04W 84/042* (2013.01)

(58) Field of Classification Search
CPC ... H04W 36/08; H04W 72/044; H04W 76/23; H04W 36/0033; H04W 72/10; H04W 48/18; H04W 36/18
See application file for complete search history.

(56) References Cited

U.S. PATENT DOCUMENTS

| | | | |
|---|---|---|---|
| 2009/0170507 A1* | 7/2009 | Kim | H04W 60/02 455/433 |
| 2010/0195643 A1 | 8/2010 | Kodali | |
| 2013/0064138 A1 | 3/2013 | Hakola | |
| 2013/0109301 A1 | 5/2013 | Hakola | |
| 2015/0201392 A1* | 7/2015 | Sartori | H04W 60/00 370/329 |

(Continued)

OTHER PUBLICATIONS

3GPP, "Digital cellular telecommunications system (Phase 2+); Universal Mobile Telecommunications System (UMTS); LTE; Non-Access-Stratum (NAS) functions related", ETSI, 3GPP TS 23.122 version 12.5.0 Release 12 (Year: 2014).*

(Continued)

*Primary Examiner* — Omer S Mian
(74) *Attorney, Agent, or Firm* — Winston Hsu (57) ABSTRACT

A communication device for handling a selection of a Public Land Mobile Network (PLMN) for a device-to-device (D2D) communication comprises a storage unit for storing instructions and a processing means coupled to the storage unit. The processing means is configured to execute the instructions stored in the storage unit. The instructions comprise detecting a first PLMN and a second PLMN when performing at least one PLMN search, wherein the first PLMN does not provide a proximity service (ProSe) and the second PLMN provides the ProSe; and selecting the second PLMN to camp on the second PLMN.

8 Claims, 5 Drawing Sheets

(56) References Cited

U.S. PATENT DOCUMENTS

2015/0245258 A1* 8/2015 Kim .................. H04W 48/18
                                                370/331
2017/0222861 A1* 8/2017 Jung .................. H04L 27/36

OTHER PUBLICATIONS

European Search report dated Feb. 15, 2016 for EP application No. 15183744.0.
TS 25.304 V1.0.0 (Apr. 1999), "3rd Generation Partnership Project (3GPP); Technical Specification Group (TSG) RAN; Working Group 2 (WG2); UE Procedures in Idle Mode", XP002752083, pp. 1-29.
3GPP TR 23.703 V2.0.0 (Feb. 2014), 3GPP Technical Specification Group Services and System Aspects; "Study on architecture enhancements to support Proximity-based Services (ProSe)", XP002752084, pp. 30-36.
SA WG2 Meeting #104 S2-142911 Dublin, Ireland; Jul. 7-11, 2014 (revision of S2-142540) CR-Form-v11 Change Request 23.303 CR 103 rev 3 Current version: 12.1.0.
3GPP TS 24.333 V12.1.0 (Dec. 2014) Technical Specification 3rd Generation Partnership Project; Technical Specification Group Core Network and Terminals; Proximity-services (ProSe) Management Objects (MO) (Release 12).
3GPP TS 24.301 V12.5.0 (Jun. 2014) Technical Specification 3rd Generation Partnership Project; Technical Specification Group Core Network and Terminals; Non-Access-Stratum (NAS) protocol for Evolved Packet System (EPS); Stage 3 (Release 12).
3GPP TS 23.122 V12.5.0 (Jun. 2014) Technical Specification 3rd Generation Partnership Project; Technical Specification Group Core Network and Terminals; Non-Access-Stratum (NAS) functions related to Mobile Station (MS) in idle mode (Release 12).

* cited by examiner

DEVICE OF HANDLING SELECTION OF PUBLIC LAND MOBILE NETWORK FOR DEVICE-TO-DEVICE COMMUNICATION

CROSS REFERENCE TO RELATED APPLICATIONS

This application claims the benefit of U.S. Provisional Application No. 62/045,580, filed on Sep. 4, 2014 and incorporated herein by reference.

BACKGROUND OF THE INVENTION

1. Field of the Invention

The present invention relates to a communication device used in a wireless communication system, and more particularly, to a communication device of handling a selection of a public land mobile network for device-to-device communication in a wireless communication system.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint (CoMP) transmissions/reception, uplink (UL) multiple-input multiple-output (UL-MIMO), etc. For a UE and an eNB to communicate with each other in the LTE-A system, the UE and the eNB must support standards developed for the LTE-A system, such as the 3GPP Rel-10 standard or later versions.

Device-to-device (D2D) communication may be realized, after an initialization (e.g., connection establishment and/or peer discovery) is performed (e.g., assisted by an eNB). Then, two UEs may communicate (e.g., transmitting and/or receiving packets) with each other directly according to the D2D communication, and the eNB does not need to forward the packets transmitted between the communication devices. According to the D2D communication, the UEs may communicate with each other via UL resources (e.g., UL subframes configured by the eNB). In general, the D2D communication may also be seen as a D2D service (i.e., proximity service (ProSe)). In addition, a D2D subframe, D2D transmission, D2D communication and D2D discovery can be termed as a sidelink subframe, sidelink transmission, sidelink communication and sidelink discovery, respectively.

An announcing UE can announce information which can be used by UEs in proximity if the UEs have permission for proximity discovery. A monitoring UE can monitor information of interest in proximity transmitted by announcing UEs. For the announcing UE, a ProSe Application Code can be received from a HPLMN ProSe function by performing an announce request procedure. The ProSe Application Code is included in a message which can be transmitted over a radio interface by a UE engaged in a ProSe direct discovery procedure to monitoring UEs. For the monitoring UE, Discovery Filter(s) for monitoring the ProSe Application Code(s) over the radio interface can be received from the HPLMN ProSe function when performing a monitor request procedure.

A UE needs to camp on a PLMN, before the UE starts to perform the D2D communication. However, the UE may detect multiple PLMNs, when the UE searches for a PLMN. According to the prior art, the UE may select one of the PLMNs arbitrarily to camp on the selected PLMN. The UE cannot perform the D2D communication regularly, if the PLMN is not selected correctly.

Thus, how to select a PLMN for the D2D communication is an important problem to be solved.

SUMMARY OF THE INVENTION

The present invention therefore provides a method and related communication device for selecting a PLMN for the D2D communication to solve the abovementioned problem.

A communication device for handling a selection of a Public Land Mobile Network (PLMN) for a device-to-device (D2D) communication comprises a storage unit for storing instructions and a processing means coupled to the storage unit. The processing means is configured to execute the instructions stored in the storage unit. The instructions comprise detecting a first PLMN and a second PLMN when performing at least one PLMN search, wherein the first PLMN does not provide a proximity service (ProSe) and the second PLMN provides the ProSe; and selecting the second PLMN to camp on the second PLMN.

A method of handling a selection of a Public Land Mobile Network (PLMN) for a device-to-device (D2D) communication, which is utilized in a communication device, comprises detecting a first PLMN and a second PLMN when performing at least one PLMN search, wherein the first PLMN does not provide a proximity service (ProSe) and the second PLMN provides the ProSe; and selecting the second PLMN to camp on the second PLMN.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
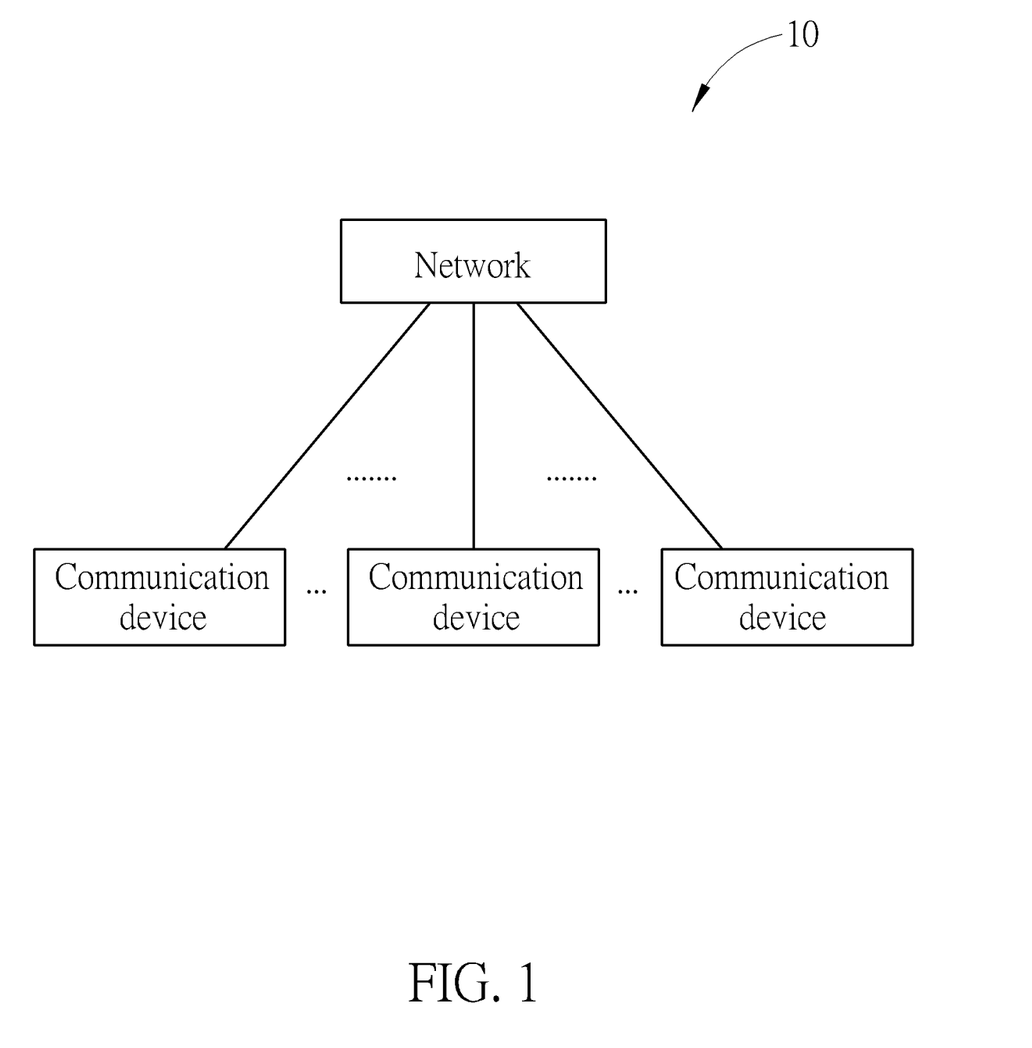
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. In FIG. 1, the network and the communication devices are simply utilized for illustrating the structure of the wireless communication system 10. A communication device may communicate with the network according to a device-to-cellular (D2C) communication defined in a communication standard, e.g., the 3rd Generation Partnership Project (3GPP) standard. Practically, the network can be a universal terrestrial radio access network (UTRAN) comprising at least one Node-B (NB) in a universal mobile telecommunications system (UMTS). In another example, the network can be an evolved UTRAN (E-UTRAN) comprising at least one evolved NB (eNB) and/or at least one relay in a long term evolution (LTE) system, a LTE-Advanced (LTE-A) system or an evolution of the LTE-A system.

Furthermore, the network may also include both the UTRAN/E-UTRAN and a core network (e.g., evolved packet core (EPC) network), wherein the core network may include network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a communication device, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. In addition, the information can be processed by both the UTRAN/E-UTRAN and the core network, and the decisions are made after coordination and/or cooperation are performed by the UTRAN/E-UTRAN and the core network.

A communication device maybe a user equipment (UE), a low cost device (e.g., machine type communication (MTC) device), a device-to-device (D2D) device, a mobile phone, a laptop, a tablet computer, an electronic book, a portable computer system, or combination thereof. In addition, for the D2C communication, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

In addition, two communication devices may communicate with each other directly, after an initialization (e.g., connection establishment and/or peer discovery) is performed. For example, the initialization may be assisted by the network. That is, the communication devices may communicate (e.g., transmit and/or receive packets) with each other according to a D2D communication defined in a communication standard, e.g., the 3GPP standard. The communication devices may communicate with each other via UL subframes determined according to frequency-division duplexing (FDD) configuration and/or time-division duplexing (TDD) configurations.

Figure 2:
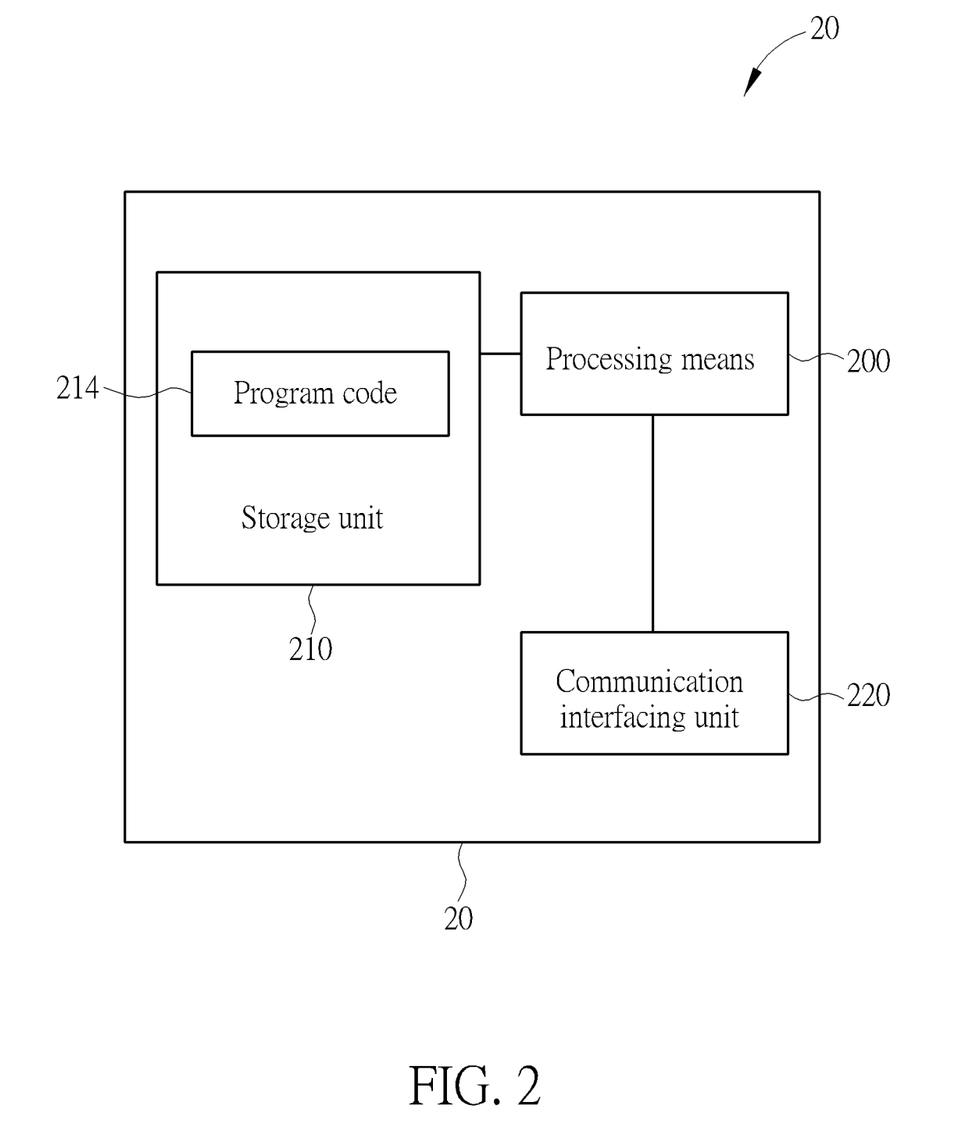
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that may store a program code 214, accessed and executed by the processing means 200. Examples of the storage unit 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage unit, non-transitory computer-readable medium (e.g., tangible media), etc. The communication interfacing unit 220 is preferably a transceiver and is used to transmit and receive signals (e.g., data, signals, messages and/or packets) according to processing results of the processing means 200.

Figure 3:
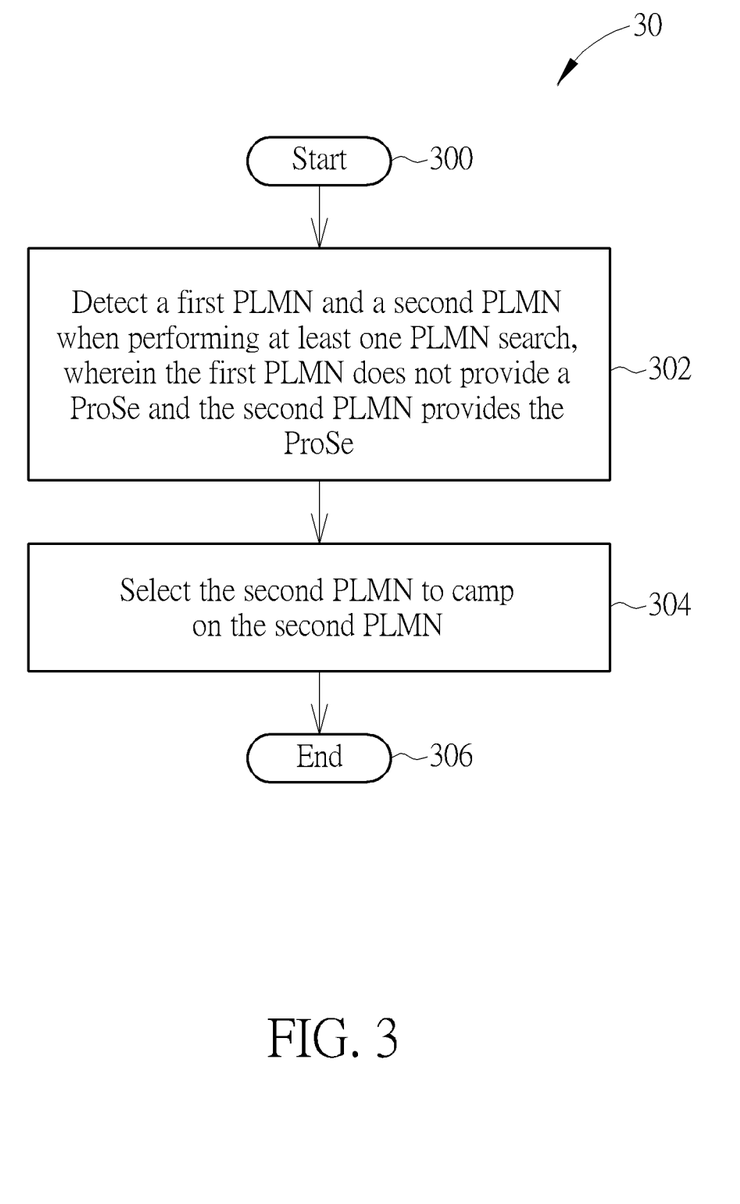
FIG. 3 is a flowchart of a process according to an example of the present invention.

FIG. 3 is a flowchart of a process 30 according to an example of the present invention. The process 30 may be utilized in a communication device in FIG. 1, to handle a selection of a Public Land Mobile Network (PLMN) for a D2D communication. The process 30 may be compiled into the program code 214 and includes the following steps:

Step 300: Start.

Step 302: Detect a first PLMN and a second PLMN when performing at least one PLMN search, wherein the first PLMN does not provide a proximity service (ProSe) and the second PLMN provides the ProSe.

Step 304: Select the second PLMN to camp on the second PLMN.

Step 306: End.

According to the process 30, the communication device (e.g., a ProSe-enabled UE) detects a first PLMN and a second PLMN when performing at least one PLMN search, wherein the first PLMN does not provide a proximity service (ProSe) and the second PLMN provides the ProSe. Then, the communication device selects the second PLMN to camp on the second PLMN instead of the first PLMN in order to initiate the ProSe. That is, the communication device selects a PLMN for camping on the PLMN according to whether the PLMN provides the ProSe. Thus, the ProSe performed by the communication device can be maintained without being interrupted due to a wrong selection of the PLMN. As a result, service continuity of the ProSe is improved.

Realization of the present invention is not limited to the above description.

The communication device in the process 30 may receive information of the ProSe-Allowed PLMN list via a service authorization procedure. The ProSe-Allowed PLMN list may include PLMN(s) allowed for a ProSe. A PLMN identity of the second PLMN is in the ProSe-Allowed PLMN list. The communication device may detect a third PLMN which provides the ProSe and an identity of the third PLMN is not in the ProSe-Allowed PLMN list. Then, the communication device selects the second PLMN instead of the third PLMN, because the identity of the second PLMN is in the ProSe-Allowed PLMN list but the identity of the third PLMN is not in the ProSe-Allowed PLMN list.

In one example, the communication device in the process 30 may receive the information of the ProSe-Allowed PLMN list via a service authorization procedure. In one example of the service authorization procedure, a HPLMN of the communication device may pre-configure the communication device with the information the ProSe-Allowed PLMN list which indicates at least one PLMN where the communication device is authorized to perform a ProSe Direct Discovery, a ProSe Direct Communication or both and additional information regarding out-of-coverage operation may be provided. That is, the information of the ProSe-Allowed PLMN list may be stored in a UMTS SIM (USIM) or flash memory of the communication device, and may be updated by an over-the-air (OTA) message sent by the HPLMN. The OTA message may be a NAS message, or may be composed of one or more Internet Protocol (IP) packets.

Figure 4:
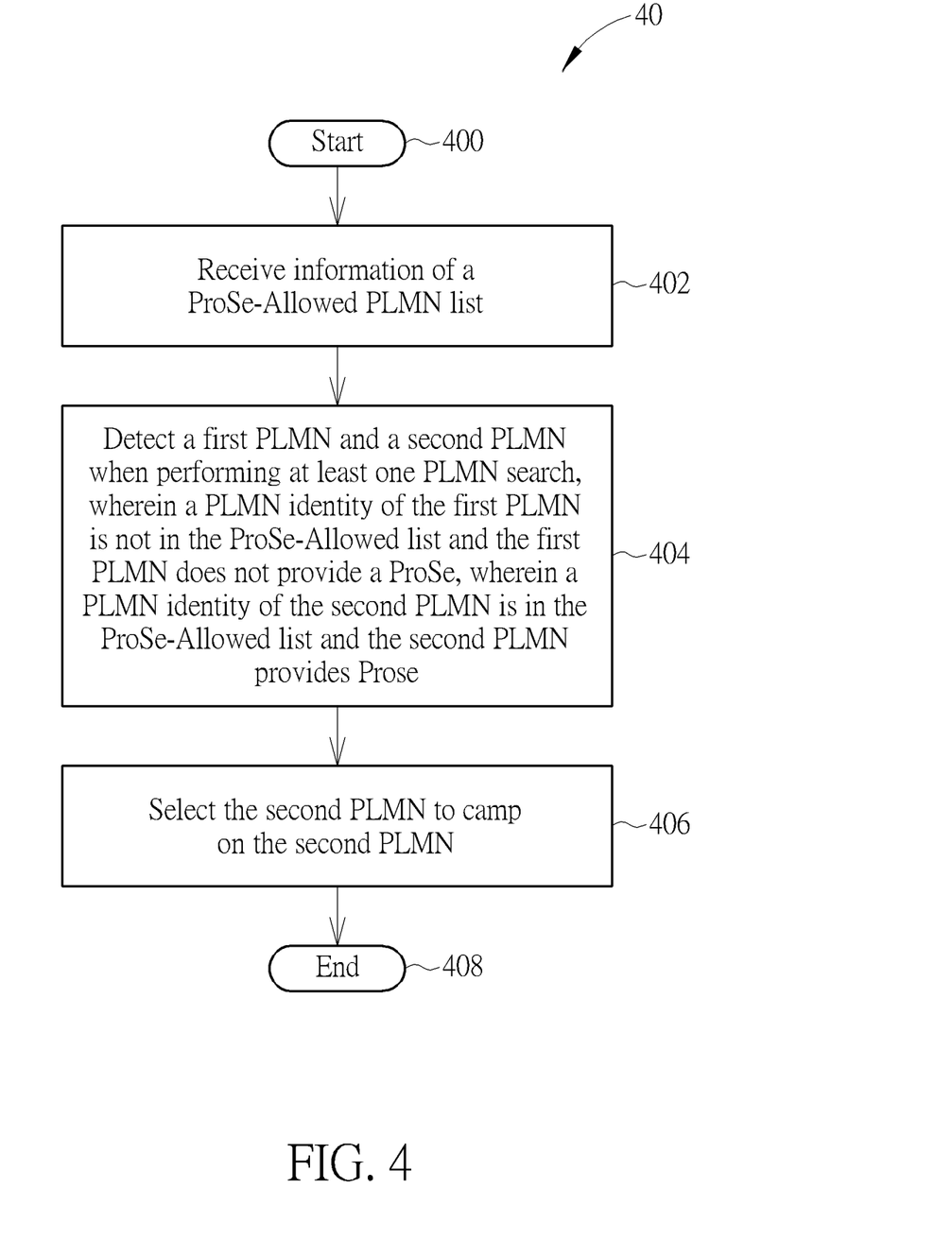
FIG. 4 is a flowchart of a process according to an example of the present invention.

FIG. 4 is a flowchart of a process 40 according to an example of the present invention. The process 40 may be utilized in a communication device in FIG. 1, to handle a selection of a PLMN for a D2D communication. The process 40 may be compiled into the program code 214 and includes the following steps:

Step 400: Start.

Step 402: Receive information of a ProSe-Allowed PLMN list.

Step 404: Detect a first PLMN and a second PLMN when performing at least one PLMN search, wherein a PLMN identity of the first PLMN is not in the ProSe-Allowed list and the first PLMN does not provide a proximity-based service (ProSe), wherein a PLMN identity of the second PLMN is in the ProSe-Allowed list and the second PLMN provides Prose.

Step 406: Select the second PLMN to camp on the second PLMN.

Step 408: End.

According to the process 40, the communication device (e.g., a ProSe-enabled UE) receives information of a ProSe-Allowed PLMN list, e.g., which includes PLMN(s) allowed for a ProSe. The communication device detects a first PLMN and a second PLMN when performing at least one PLMN search, wherein a PLMN identity of the first PLMN is not in the ProSe-Allowed list and the first PLMN does not provide a ProSe, wherein a PLMN identity of the second PLMN is in the ProSe-Allowed list and the second PLMN provides the ProSe. Then, the communication device selects the second PLMN to camp on the second PLMN instead of the first PLMN in order to initiate the ProSe. That is, the communication device selects a PLMN for camping on the PLMN according to whether the PLMN provides the ProSe. One way of the determinations whether a PLMN provides the ProSe or not is to check whether the PLMN is in the ProSe Allowed list. Thus, the ProSe performed by the communication device can be maintained without being interrupted due to a wrong selection of the PLMN. As a result, service continuity of the ProSe is improved.

Realization of the present invention is not limited to the above description. Following examples may be applied to the process 30 and process 40.

In one example, the communication device may further transmit at least one of a registration message (e.g., Attach Request or Tracking Area Update Request) and a discovery request to the second PLMN, after selecting the second PLMN. The discovery request is for requesting announcing or monitoring. The communication device may or may not transmit the discovery request immediately after completing the registration procedure. A condition according to which the communication device starts to perform the at least one PLMN search is not limited. For example, the communication device may perform the at least one PLMN search, when the communication device camps on a third PLMN and receives a rejection of a service authorization request from a home PLMN (HPLMN) of the communication device. Further, the rejection may include a cause value indicating that the third PLMN is not allowed. Note that the third PLMN may or may not be the first PLMN. In another example, the at least one PLMN search may be triggered by a mobility of the communication device. That is, the communication device may perform the at least one PLMN search, when the communication device moves across one or more boundaries of PLMNs.

In another example, the at least one PLMN search may be triggered by initiation of a ProSe (e.g. ProSe Direct Discovery or ProSe Direct Communication service) or by a manual PLMN search for searching a PLMN supporting the ProSe, if the currently camped PLMN does not provide the ProSe Direct Discovery or ProSe Direct Communication service. Furthermore, if the communication device does not receive the information of the ProSe-Allowed PLMN list, the communication device may search any PLMN which supports the ProSe. A cell of a PLMN may indicate support of the ProSe in system information broadcasted in the cell. The communication device may obtain the PLMN supporting the ProSe by reading the system information.

In one example, a priority of the first PLMN may be higher than a priority of the second PLMN. That is, whether a PLMN is in the ProSe-Allowed PLMN list is prioritized over a priority of the PLMN. The communication device may select a PLMN in the ProSe-Allowed PLMN list, if other detected PLMN(s) with higher priorit(ies) is not in the ProSe-Allowed PLMN list. Further, information of the priority of the first PLMN and information of the priority of the second PLMN may be stored in the communication device. For example, the information may be stored in a USIM of the communication device.

In one example, the communication device may be configured with a non-zero non-deactivated validity timer of a ProSe discovery (e.g., ProSe direct discovery) for announcing and/or at least one valid time-to-live (TTL) of a discovery filter for monitoring. That is, the service continuity is maintained by the communication device by camping on a PLMN in the ProSe-Allowed PLMN list, if the communication device is performing the ProSe discovery for the announcing and/or the monitoring.

In one example, the communication device may select the second PLMN for camping on the second PLMN, if the communication device is configured to select a PLMN which provides the ProSe with higher priority and to select a PLMN which does not provide the ProSe with lower priority according to a configuration received from the HPLMN. The HPLMN may transmit the configuration via a ProSe Direct Service Provisioning Management Object (MO). That is, the communication device selects the PLMN which provides the ProSe in higher priority than the other PLMN which does not provide the ProSe according to the configuration. Further, the configuration may be a new leaf in a MO for a PLMN or in a MO for the communication device.

Figure 5:
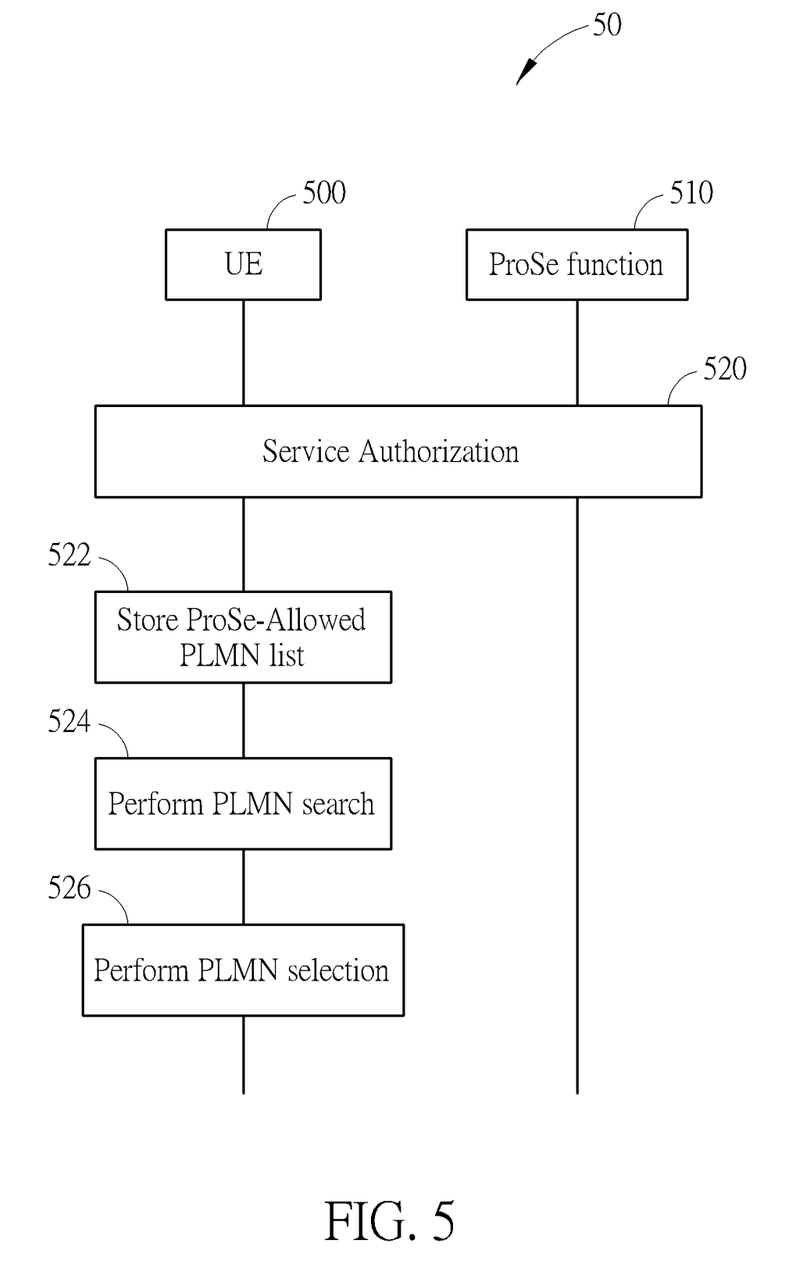
FIG. 5 is a flowchart of a process according to an example of the present invention.

FIG. 5 is a flowchart of a process 50 according to an example of the present invention, where a UE 500 and a ProSe function 510 are shown. In the present example, the UE 500 may be a ProSe-enabled UE, and the ProSe function 510 may be a ProSe function in a HPLMN of the UE 500. According to the present invention, the UE 500 may obtain a ProSe-Allowed PLMN list when performing a service authorization procedure (step 520). Then, the UE 500 may store the ProSe-Allowed PLMN list (step 522), e.g., in a USIM or flash memory of the UE 500. The UE 500 may perform the one or more PLMN searches due to a certain condition (step 524), e.g., mobility of the UE 500 or initiation of the ProSe. Accordingly, the UE 500 may select a PLMN for camping on the PLMN according to a result of the searching and the ProSe-Allowed PLMN list (step 526).

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, an automotive head unit or combination thereof. An example of the means may be the communication device 20.

Examples of the hardware may include analog circuit(s), digital circuit (s) and/or mixed circuit (s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the communication device 20.

To sum up, the present invention provides a method and related communication device for handling a selection of a PLMN for a D2D communication. The D2D communication performed by the communication device can be maintained without being interrupted due to a wrong selection of the PLMN. As a result, service continuity of the D2D communication is improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A proximity service (ProSe)-enabled communication device for handling a selection of a Public Land Mobile Network (PLMN) for a device-to-device (D2D) communication during at least one PLMN search procedure, comprising:

a storage unit for storing instructions of:

receiving an Equivalent PLMN (EPLMN) list with priority information for PLMN selection by the Prose-enabled communication device, via an Attach or a Tracking Area Update (TAU) procedure, wherein an identity of a second PLMN and an identity of a first PLMN are in the EPLMN list with the first PLMN having higher priority than the second PLMN according to the priority information;

receiving a ProSe-Allowed PLMN list via a service authorization procedure with an home PLMN (HPLMN), after receiving the EPLMN list via the Attach or the TAU procedure, wherein the identity of the second PLMN is in the ProSe-Allowed PLMN list and the identity of the first PLMN is not in the ProSe-Allowed PLMN list, and all PLMNs of the ProSe-Allowed PLMN list support ProSe services;

detecting the first PLMN and the second PLMN when performing the at least one PLMN search based on the EPLMN list;

selecting the second PLMN to camp on the second PLMN based on the ProSe-Mowed PLMN list, wherein the first PLMN does not provide the ProSe and the second PLMN provides the ProSe; and performing the at least one PLMN search, when the communication device camps on a third PLMN and receives a rejection of a service authorization request from the HPLMN of the communication device;

wherein the rejection comprises a cause value indicating that the third PLMN is not allowed; and a processing means, coupled to the storage unit, configured to execute the instructions stored in the storage unit.

2. The communication device of claim 1, wherein the storage unit further stores the instruction of: transmitting at least one of a registration message and a discovery request to the second PLMN, after selecting the second PLMN.

3. The communication device of claim 1, wherein the at least one PLMN search is triggered by a mobility of the communication device.

4. The communication device of claim 1, wherein the communication device is configured to select the PLMN which provides the ProSe with higher priority and to select the PLMN which does not provide the ProSe with lower priority according to a configuration received from a HPLMN.

5. A method of handling a selection of a Public Land Mobile Network (PLMN) for a device-to-device (D2D) communication during at least one PLMN search procedure, the method being utilized in a proximity service (ProSe)-enabled communication device and comprising:

receiving an Equivalent PLMN (EPLMN) list with priority information for PLMN selection by the ProSe-enabled communication device, via an Attach or a Tracking Area Update (TAU) procedure, wherein an identity of a second PLMN and an identity of a first PLMN are in the EPLMN list with the first PLMN having higher priority than the second receiving a ProSe-Allowed PLMN list via a service authorization procedure with an home PLMN (HPLMN), after receiving the EPLMN list via the Attach or the TAU procedure, wherein the identity of the second PLMN is in the ProSe-Allowed PLMN list and the identity of the first PLMN is not in the ProSe-Allowed PLMN list, and all PLMNs of the ProSe-Allowed PLMN list support ProSe services;

detecting the first PLMN and the second PLMN when performing the at least one PLMN search based on the EPLMN list;

selecting the second PLMN to camp on the second PLMN based on the ProSe-Allowed PLMN list, wherein the first PLMN does not provide the ProSe and the second PLMN provides the ProSe; and performing the at least one PLMN search, when the communication device camps on a third PLMN and receives a rejection of a service authorization request from the HPLMN of the communication device;

wherein the rejection comprises a cause value indicating that the third PLMN is not allowed.

6. The method of claim 5, further comprising: transmitting at least one of a registration message and a discovery request to the second PLMN, after selecting the second PLMN.

7. The method of claim 5, wherein the at least one PLMN search is triggered by a mobility of the communication device.

8. The method of claim 5, wherein the communication device is configured to select the PLMN which provides the ProSe with higher priority and to select the PLMN which does not provide the ProSe with lower priority according to a configuration received from a HPLMN.

\* \* \* \* \*